3,276,993
COMPOSITIONS AND METHODS FOR THE CONVERSION OF HYDROCARBONS EMPLOYING A CRYSTALLINE ALUMINA-SILICATE CATALYST COMPOSITE
Luther J. Reid, Jr., Audubon, N.J., assignor to Mobil Oil Corporation, a corporation of New York
No Drawing. Filed Feb. 12, 1964, Ser. No. 344,252
8 Claims. (Cl. 208—120)

The present invention relates to new catalysts and to methods for producing and utilizing such catalysts. More specifically, the present invention relates to composite catalysts comprising finely divided catalytically active particles occluded within porous carrier particles and to methods for making and utilizing such catalysts.

Recently, a new class of materials known as crystalline metal aluminosilicates has been found to possess catalytic activity for a wide variety of organic conversion reactions and especially for the catalytic cracking of petroleum. Some crystalline metal aluminosilicates have been found to have truly extraordinary cracking activity on the order of several thousand times the activity of conventional amorphous silica-alumina gel cracking catalysts.

While such exceptional activity holds great promise for significant future improvement in the catalytic cracking of petroleum and in other processes involving the use of such catalysts, conventional systems and apparatus are not adapted to take full advantage of such highly active catalysts.

Therefore, a number of techniques have been developed to modify the properties of crystalline metal aluminosilicate catalysts so that they can be employed to advantage in conventional catalytic systems. Among the methods developed for this purpose are steam treating, ion-exchange, mixing with less active or inert materials and the formation of composite particles with less active or inert matrix components.

Compositing has generally been carried out by uniformly distributing particles of the active crystalline metal aluminosilicate component in a less active or inert component. The distribution of the active component throughout the less active or inert matrix component has been done in either of two principal ways. One basic method comprises uniformly mixing particles of the active component with gel-forming solutions and then setting the solutions to form gel particles within which the active particles are dispersed. A second major method involves forming a slurry of particles of both the active and matrix components and then spray drying to produce composite particles.

In both of the described methods, the catalyst produced, whether in the form of beads or fluid particles, contains the active component dispersed relatively uniformly throughout the matrix component. This fact may raise certain problems in the use of such a catalyst.

For example, where the catalyst is employed for cracking a petroleum charge, the portion of the active component in the core of the catalyst particle may be relatively inaccessible to the hydrocarbon vapors. Therefore, at least part of the active component of the catalyst is ineffective and the cracking efficiency of the catalyst is reduced.

Also, the distribution of the particles of the active component throughout the matrix may reduce the coherence of the particles and result in low attrition resistance. In any process involving the re-use of the catalyst, lack of attrition resistance is a serious deficiency, since it requires continual replacement of the disintegrated catalyst and removal of the fines so produced.

A major object of the present invention, therefore, is to provide an improved composite catalyst comprising an active component and a relatively inactive or inert component.

Another object of the present invention is to provide an improved petroleum cracking catalyst comprising an active crystalline metal aluminosilicate component and a relatively inactive or inert matrix component.

A further object of the present invention is the provision of a new and efficient method for cracking petroleum charge materials.

Another object of the present invention is to provide new composite catalyst particles comprising an active crystalline metal aluminosilicate component and a less active or inert matrix component and characterized by good attrition resistance.

The manner in which the above objects and many other highly desirable objects and advantages of the present invention are achieved will be apparent in the light of the following detailed description of the invention.

In general, in accordance with the present invention composite catalysts are provided which comprise a relatively inactive or inert matrix component and an active component. The matrix component of the composite catalyst consists of macropore base particles into which finely divided particles of the active component are sifted.

The macropore base particles preferably have a minimum diameter of 2mm. At least about 50% of the pores of said base particles should preferably have a diameter greater than 50 microns. The active component is in the form of particles having diameters smaller than 50 microns.

The active component is sifted into the pores of the base particles at least to the extent of about 0.5% by weight and up to about 20% by weight of the base.

It is also preferable that the base particles have hard and relatively non-porous cores and that the active component penetrate the base or matrix particles only to a depth of from about ⅛ to ½ of the radius of the base particles.

In a preferred embodiment of the invention, the active component is a crystalline metal aluminosilicate having the following general formula:

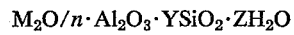

$$M_2O/n \cdot Al_2O_3 \cdot YSiO_2 \cdot ZH_2O$$

in the salt form, wherein $n$ is the valence of the metal cation M, Y is the number of moles of silica and $Z \cdot H_2O$ is the water of hydration.

Crystalline aluminosilicates of the above structure, sometimes referred to as crystalline zeolites or molecular sieves, may be activated by removal of the water of hydration and when so activated, they possess sites capable of promoting catalytic conversions. Upon dehydration, the aluminosilicates are found to be highly porous and possess numerous surface cavities and internal pores connecting the cavities. These pores are of substantially constant diameter, generally in the range of from 3 to 13 Angstroms, the exact size depending upon the composition and structure of the specific aluminosilicate.

In order to modify the properties of such materials, the original cations of the aluminosilicates, usually sodium, potassium, and/or calcium, may also be changed by processes of ion-exchange. Ion-exchange of the original ions has been found to have an especially beneficial effect on the catalytic cracking properties of the crystalline aluminosilicates.

Suitable crystalline aluminosilicates for use in the production of catalysts of the present invention include both natural and synthetic crystalline aluminosilicates.

A fairly wide variety of natural crystalline zeolites exist and, among these, faujasite has been found to be an especially useful material for the preparation of the catalysts of this invention. Other satisfactory natural crystalline zeolites include, for example, analcite, paulingite, ptilolite, clinoptilolite, ferrierite, chabazite, gmelinite, levynite, erionite and mordenite.

Among the most suitable synthetic crystalline aluminosilicates are the synthetic faujasites, including both X and Y types which have a crystal structure corresponding to that of natural faujasite. The preparation of such X aluminosilicates is described in U.S. Patent 2,882,244 Milton issued April 14, 1959. The preparation of the Y type is described in Belgian Patent 577,642.

Another important synthetic crystalline zeolite not having a corresponding natural form is Zeolite A. The preparation of this crystalline aluminosilicate is described in U.S. Patents 2,882,243 Milton and 2,982,612 Barrer et al.

Other suitable synthetic crystalline zeolites useful in the present invention include, for example: Y zeolite, B zeolite, E zeolite, F zeolite, G zeolite, H zeolite, K-G zeolite, J zeolite, L zeolite, M zeolite, K-M zeolite, Q zeolite, R zeolite, S zeolite, T zeolite, U zeolite, Z zeolite and others.

Highly useful crystalline aluminosilicate catalysts may be prepared by subjecting sodium X molecular sieve to ion exchange with a solution of rare earth chlorides until the sodium content is reduced to below about 1.0% or within the range of 0.2% to 1.0% by weight of sodium and until about 25% by weight of rare earth ions calculated as rare earth oxides is introduced.

The various forms of synthetic crystalline aluminosilicates are also sometimes identified by numerical prefixes, as for example 4A-, 5A- and 13X-zeolite. The 4A and 5A materials are zeolites of crystalline structure A and have a pore size of about 4A. and 5A. diameter respectively. A 13X material is one having an X crystalline structure and a pore size of about 10A. diameter.

The aluminosilicate materials may also be converted to the H or acid form in which hydrogen ions occupy the cation sites. For example, such a conversion may be had by ion-exchange with an ammonium ion followed by heating to drive off $NH_3$ or by controlled acid leaching with a hydrochloric acid solution or like reagent. In general, the H form is more stable in materials having $SiO_2/Al_2O_3$ of 3.5 or higher. Useful catalysts are also produced by a combination of ion-exchange treatment. For example, the crystalline aluminosilicates may be converted to the H or acid form by acid leaching and then may be ion-exchanged with a solution of rare earth salts to produce catalysts such as rare earth-hydrogen exchanged mordenite, rare earth-hydrogen exchanged synthetic faujasite of X or Y type and many other useful ion-exchanged catalysts. It will also be apparent that more than one type of metal cation may be used to ion-exchange the crystalline aluminosilicates and that the sequence of ion-exchange treatments may be varied. For example, acid leaching to substitute hydrogen ions may precede or follow ion-exchange treatment to substitute metal cations.

According to other embodiments of the invention, the active component may be a platinum metal, for example ruthenium, rhodium, palladium, osmium, iridium and platinum, or copper chromite. Particles of copper chromite of of one of the platinum metals sifted into the pores of the macroporous base or matrix particles produce composite oxidation catalysts. Such products are especially useful for the oxidation of exhaust gases generated by the combustion of lead-free gasoline in automobile or other engines.

The base particle may be any suitable macroporous material such as alumina, silica-alumina, silicia, zirconia, magnesium aluminate, titania, zicronium silicate, and the like.

Preferably, the base particles have a non-porous core and a layer of sintered particles on the core which provide a macroporous structure at the surface of the particles. Thus, when the finely divided active component is sifted into the macroporous layer, it penetrates only as far as the dense core, to a depth of from generally about ¼ to ½ of the particle radius.

Especially useful catalysts for the cracking of petroleum comprise macropore base particles of inert silica-alumina and an active component of rare earth ion-exchanged natural or synthetic faujasite or rare earth ion-exchanged L zeolite.

Where oxidation catalysts are produced employing an active component of platinum or copper chromite, the macropore base is preferably a pure alumina material.

The present invention will perhaps be more fully appreciated in the light of the following detailed examples which illustrate preferred embodiments of the invention.

EXAMPLE 1

Inert silica-alumina macroporous base particles known as Norton SA 5215 5/16" spheres were rolled with finely divided rare earth exchanged X aluminosilicate powder. The base particles were 85% alumina and 15% silica where 90% of the pores were greater than 50 microns in diameter. The particles of the rare earth exchanged X aluminosilicate powder were under 50 microns in diameter.

The resulting catalyst was analyzed and was found to contain 1.16% of rare earth oxide or about 4.5% of rare earth ion-exchanged X aluminosilicate. Visual inspection showed the active component to be concentrated near the surface of the base particles.

EXAMPLE 2

A catalyst comprising 4.5% by weight of rare earth ion-exchanged X aluminosilicate distributed uniformly in a silica-alumina gel matrix was evaluated by a method known as the Cat-D Test.

The Cat-D test is similar to the procedure known in the art as the Cat-A test, the major difference between the two methods being the product recovery system. The cracked products in the Cat-A test are condensed and collected at 60° F. while the light gases pass directly to a gas recovery system. In the Cat-D test, however, the heavier cracked products are condensed at 150° F. while the light products are passed through a cold trap at —100° F. before they enter a gas collecting system. The condensate in the cold trap is weathered slowly to 150° F. after the run.

In conducting the catalyst evaluation by the Cat-D Test a charge stock was used which comprises a standard Mid-Continent Gas Oil having the following specifications:

| | |
|---|---|
| API | 28.8 |
| Aniline No., F. | 181.5 |
| Sulfur, percent wt. | 0.52 |
| Nitrogen, percent wt. | 0.07 |
| Carbon residue, percent wt. | 0.35 |

Distillation, F.:

| | |
|---|---|
| IBP percent vol. | 458 |
| 5 percent vol. | 551 |
| 10 percent vol. | 557 |
| 20 percent vol. | 601 |
| 30 percent vol. | 630 |
| 40 percent vol. | 665 |
| 50 percent vol. | 705 |
| 60 percent vol. | 752 |
| 70 percent vol. | 778 |
| 80 percent vol. | 854 |
| 90 percent vol. | 919 |
| 95 percent vol. | 947 |
| EP percent vol. | — |

The charge stock was fed into a pre-heater by means of a positive displacement pump. The pre-heater was connected to a cracking case. Both pre-heater and cracking case are made from sections of 28 mm. O.D. standard-wall glass tubing connected by a short neck of heavy glass tubing. A plug made from stainless steel screen was inserted in the tube connecting the pre-heater and cracking case. The pre-heater was filled with 125 ml. of 4–5 mesh crushed quartz. The pre-heater and reactor were inserted in a tubular furnace and were supported from the bottom by a West condenser.

The charge stock was then converted under the following reactor conditions:

| | |
|---|---|
| Space velocity, liquid hourly | 3.0 |
| Catalyst to oil ratio, vol./vol. | 2.0 |
| Average reactor temperature, ° F. | 875 |
| Catalyst volume, ml. | [1] 100 |
| Oil charge ratio, ml./min. | 5 |
| Time on stream, min. | 10 |

[1] 100 ml. catalyst is mixed with 100 ml. of quartz, giving a total volume of 200 ml.

The conversion products drained into the condenser and were cooled and collected, while the gas by-products of the reaction were chilled in a Dry-Ice-acetone cold trap after which the gas was collected at atmospheric pressure.

The by-product of the conversion were examined and provided the following results:

| | |
|---|---|
| $C_4$ Free Gasoline, percent vol. | 35.5 |
| Total $C_4$'s, percent vol. | 6.1 |
| Dry Gas, percent vol. | 2.2 |
| Coke, percent wt. | 1.3 |
| Conversion, percent vol. | 38.3 |

EXAMPLE 3

The catalyst of Example 1 was subjected to the Cat-D test and provided the following results:

| | Advantage of the catalyst of Example 1 over the catalyst of Example 2 |
|---|---|
| $C_4$ Free Gasoline, percent vol. | +2.3 |
| Total $C_4$'s, percent vol. | −1.6 |
| Dry Gas, percent vol. | −1.0 |
| Coke, percent wt. | −0.3 |

It will be seen from the above data that the catalyst of Example 1 in which the particles of rare earth ion-exchanged X aluminosilicate are sifted into the surface of macroporous base particles and are concentrated in the pores near the surface of the base particles, is significantly more effective than the catalyst of Example 2, in which the rare earth ion-exchanged X aluminosilicate active component is uniformly dispersed. The catalyst of Example 1 results in a higher production of $C_4$-free gasoline and a decrease in $C_4$'s, dry gas and coke.

EXAMPLE 4

100 grams of large pore diameter base particles (Norton LA 800 ¼ inch spheres) comprising 85% alumina and 15% silica and having 90% of the pores over 50 microns in size were rolled for 12 hours in a jar containing 15 grams of a finely divided copper chromite powder having a particle diameter of under 50 microns. Particles of the catalyst were then split in two parts, and it was observed that the black copper chromite powder had sifted into the base material to a distance of about 1/64 of an inch or approximately 1/8 of the radius of the particle.

The catalyst prepared in this way is suitable for diffusion controlled reactions and is useful where it is desirable to employ a very small quantity of an expensive material in a high concentration near the exterior surface of the catalyst particle. By this method, an active catalyst can be incorpoarted into a hard attrition resistant carrier to produce a composite catalyst having reduced diffusion resistance.

The copper chromite impregnated carrier is suitable as an oxidation catalyst for an automobile catalytic converter in order to completely oxidize the combustion gases of a gasoline internal combustion engine.

EXAMPLE 5

The method of Example 4 was then repeated except that platinum impregnated alumina powder was substituted for the copper chromite and substantially pure alumina was substituted for the silica-alumina base particles.

EXAMPLE 6

*Catalyst preparation*

A slurry of 400 gms. of gamma alumina (KA101) in 1000 ml. of water was wet ball milled until the average particle size of the alumina was 4 microns. Then, 174 ml. of chloroplatinic acid containing 0.046 gms. of platinum per ml. of solution was slowly added to the agitated slurry. The slurry was evaporated to dryness and calcined in an atmosphere of air at 1000° F. for three hours.

Twelve pounds of macropore base (Norton SA 5215) were rolled in the powder until 290 grams of the platinum impregnated alumina powder had sifted into the pores of the base.

*Conversion*

A catalytic converter, such as that described in U.S. Patent 3,024,593 is filled with the supported platinum catalyst particles. When the converter is attached to an automobile, in place of the usual muffler, the residue of hydrocarbons and carbon monoxide in the exhaust gas are oxidized to carbon dioxide and water. Typical performance for such a converter used with a vehicle operating on lead free gasoline is as follows:

| Mode | Inlet Exhuast Gas Temperature, ° F. | Percent Conversion to Water and/or Carbon Dioxide | |
|---|---|---|---|
| | | Hydrocarbons | Carbon Monoxide |
| 30 m.p.h. cruise | 700 | 80 | 80 |
| 40 m.p.h. cruise | 800 | 90 | 90 |
| 60 m.p.h. cruise | 1,000 | 98 | 98 |

The automotive exhaust gas conversion catalysts are effective over a temperature range of 500° F. to 1600° F.

Thus, it will be seen that the present invention provides a new class of highly active composite catalysts having good attrition resistance. Since the active component of the composite is concentrated at or near the surface of the catalyst, problems of diffusion are also minimized when using such catalysts.

The invention also provides methods for conducting oxidation, cracking and many other conversion reactions in a most efficient manner by use of the present catalysts.

While the present invention has been described in detail and illustrated with reference to certain specific embodiments, it will be obvious to those skilled in the art that various modifications may be made without departing from the spirit or scope of the invention as expressed in the following claims.

What is claimed is:

1. A method for producing a composite catalyst, comprising rolling together preformed discrete macroporous base particles having a minimum diameter of about 2 mm. and having at least about 50% of pores of a diameter greater than 50 microns with finely divided active catalyst particles smaller than about 50 microns in diameter selected from the group consisting of ruthenium, rhodium, palladium, osmium, iridium, platinum, copper chromite and a crystalline aluminosilicate, and continuing said rolling until about 0.5 to about 20% by weight, based on the weight of said base, of said active catalyst particles is sifted into the pores of said base particles adjacent the outer surface thereof.

2. The method of claim 1 wherein said active catalyst is a rare earth exchanged crystalline aluminosilicate.

3. The method of claim 1 wherein said base particles are silica-alumina and said active catalyst is a rare earth exchanged crystalline faujasite.

4. The method of claim 1 wherein said base particles are substantially pure alumina.

5. A composite catalyst comprising preformed discrete macroporous base particles having a minimum diameter of about 2 mm. and having at least about 50% of the pores of a diameter greater than 50 microns and between about 0.5 to 20% based on the weight of said base particles of finely divided particles of an active catalyst component deposited in the pores of said macroporous base particles adjacent the outer surface thereof, said active catalyst component being selected from the group consisting of ruthenium, rhodium, palladium, osmium, iridium, platinum, copper chromite and a crystalline aluminosilicate, which composite catalyst is produced by sifting together said base particles with finely divided particles of said active catalyst component smaller than about 50 microns in diameter.

6. A process for converting a hydrocarbon charge comprising contacting the same under conversion conditions including a temperature between about 500° to 1600° F. with the catalyst of claim 5.

7. A process according to claim 6, wherein said active catalyst component is a crystalline aluminosilicate, and wherein the conversion conditions comprise hydrocarbon cracking conditions.

8. A method for producing a composite catalyst, comprising rolling together preformed discrete macroporous base particles having a minimum diameter of about 2 mm. and having at least 50% of pores of a diameter greater than 50 microns with finely divided active catalyst particles being smaller than about 50 microns in diameter, said base particles being selected from the group consisting of silica, alumina, silica-alumina, magnesium aluminate, zirconia, titania and zirconium silicates, said active catalyst particles being selected from the group consisting of ruthenium, rhodium, palladium, osmium, iridium, platinum, copper chromite and a crystalline metal aluminosilicate and continuing said rolling until about 0.5 to about 20% by weight, based on the weight of said base, of said active catalyst particles is sifted into the pores of said base particles adjacent the outer surface thereof.

References Cited by the Examiner
UNITED STATES PATENTS

| | | | |
|---|---|---|---|
| 2,323,728 | 7/1943 | Ruthruff | 252—449 |
| 3,140,253 | 7/1964 | Plank et al. | 208—120 |

DELBERT E. GANTZ, *Primary Examiner.*

A. RIMENS, *Assistant Examiner.*